US011415235B2

(12) United States Patent
Wong

(10) Patent No.: US 11,415,235 B2
(45) Date of Patent: Aug. 16, 2022

(54) HYDRANT VALVE WITH INTERNAL SHUT-OFF VALVE

(71) Applicant: RAYCON INDUSTRIES, INC., Brea, CA (US)

(72) Inventor: Tak-Yiu Wong, Long Beach, CA (US)

(73) Assignee: Raycon Industries, Inc., Brea, CA (US)

( * ) Notice: Subject to any disclaimer, the term of this patent is extended or adjusted under 35 U.S.C. 154(b) by 0 days.

(21) Appl. No.: 17/116,406

(22) Filed: Dec. 9, 2020

(65) Prior Publication Data

US 2021/0088150 A1 Mar. 25, 2021

Related U.S. Application Data

(63) Continuation of application No. 16/241,706, filed on Jan. 7, 2019, now Pat. No. 10,865,898, which is a continuation of application No. 15/694,219, filed on Sep. 1, 2017, now Pat. No. 10,203,040.

(60) Provisional application No. 62/382,686, filed on Sep. 1, 2016.

(51) Int. Cl.
*F16K 31/12* (2006.01)
*F16K 15/18* (2006.01)
*F16K 31/122* (2006.01)
*F16K 1/12* (2006.01)
*B64F 1/28* (2006.01)

(52) U.S. Cl.
CPC ............ *F16K 15/1826* (2021.08); *B64F 1/28* (2013.01); *F16K 1/126* (2013.01); *F16K 31/1221* (2013.01)

(58) Field of Classification Search
CPC .... F16K 1/126; F16K 15/186; F16K 31/1221; F16K 15/1826; B64F 1/28
See application file for complete search history.

(56) References Cited

U.S. PATENT DOCUMENTS

| | | | |
|---|---|---|---|
| 2,943,636 | A | 12/1957 | Reed et al. |
| 3,971,405 | A | 7/1976 | Millar et al. |
| 3,994,316 | A | 11/1976 | Brown |
| 4,078,577 | A | 3/1978 | Brown |
| 6,742,539 | B2 | 6/2004 | Lyons |
| 10,203,040 | B2 | 2/2019 | Wong |

*Primary Examiner* — Reinaldo Sanchez-Medina
(74) *Attorney, Agent, or Firm* — Knobbe Martens Olson & Bear LLP

(57) ABSTRACT

A hydrant valve with an internal automatic shut-off valve. The internal valve blocks communication between a piston chamber and a hydrant chamber when in a closed position. An upper valve opens the internal valve against its biasing force permitting the flow of fluid between the hydrant chamber and the piston chamber. The internal valve closes in response to a disconnection of the upper valve.

10 Claims, 4 Drawing Sheets

HYDRANT VALVE WITH INTERNAL SHUT-OFF VALVE

TECHNICAL FIELD

This application relates to the field of hydrant valves commonly used in aircraft fueling. In particular, it relates to a hydrant valve with an internal shut-off valve.

BACKGROUND

A hydrant valve used in aircraft fueling delivers fuel by connecting fuel storage through an underground pipeline at its inlet to an aircraft through a fueling vehicle equipped with a hydrant valve coupler and hose system at its outlet. For safety reasons, to avoid a collision with an aircraft or a supporting vehicle around the aircraft, hydrant valves are usually installed in a hydrant pit below ground level.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

One aspect relates to a hydrant valve including a hydrant chamber having an inlet and an outlet. A piston is in the hydrant chamber and is moveable between open and closed positions relative to the inlet. A chamber is disposed within the piston in communication with the inlet and in selective communication with the hydrant chamber. An upper valve is movable between open and closed positions relative to the outlet. The upper valve has a biasing member that biases the upper valve toward the closed position. In the closed position the upper valve restricts fluid flow through the outlet and in the open position the upper valve permits fluid flow through the outlet. An internal valve is movable between open and closed positions in response to a movement of the upper valve. In the open position, the internal valve permits fluid flow between the piston chamber and the hydrant chamber and, in the closed position, the internal valve restricts fluid flow between the piston chamber and the hydrant chamber.

In some configurations, a pilot valve is movable between open and closed positions. In the open position the pilot valve allows flow between the inlet and the internal valve and in the closed position the pilot valve allows flow between the inlet and the piston chamber.

In some configurations, the valve further comprises an upper portion.

In some configurations, at least one frangible connector secures the upper portion to a hydrant body.

In some configurations, the internal valve moves towards the closed position in response to the upper valve moving towards the closed position.

In some configurations, in the closed position the internal valve allows fluid flow between the inlet and the piston chamber and closes the piston.

In some configurations, the internal valve moves towards the closed position in response to a movement of the upper portion.

In some configurations, the internal valve moves towards the closed position in response to at least a partial removal of the upper portion.

In some configurations, a coupler is configured to open the upper valve when attached, wherein the internal valve closes when the coupler is detached.

In some configurations, the piston is in the closed position when the internal valve is in the closed position and the pilot valve is in the open position.

BRIEF DESCRIPTION OF THE DRAWINGS

These and other features, aspects and advantages of the present invention are described herein with reference to drawings of preferred embodiments, which are intended to illustrate, and not to limit, the present invention.

DETAILED DESCRIPTION

Introduction

Figure 1:
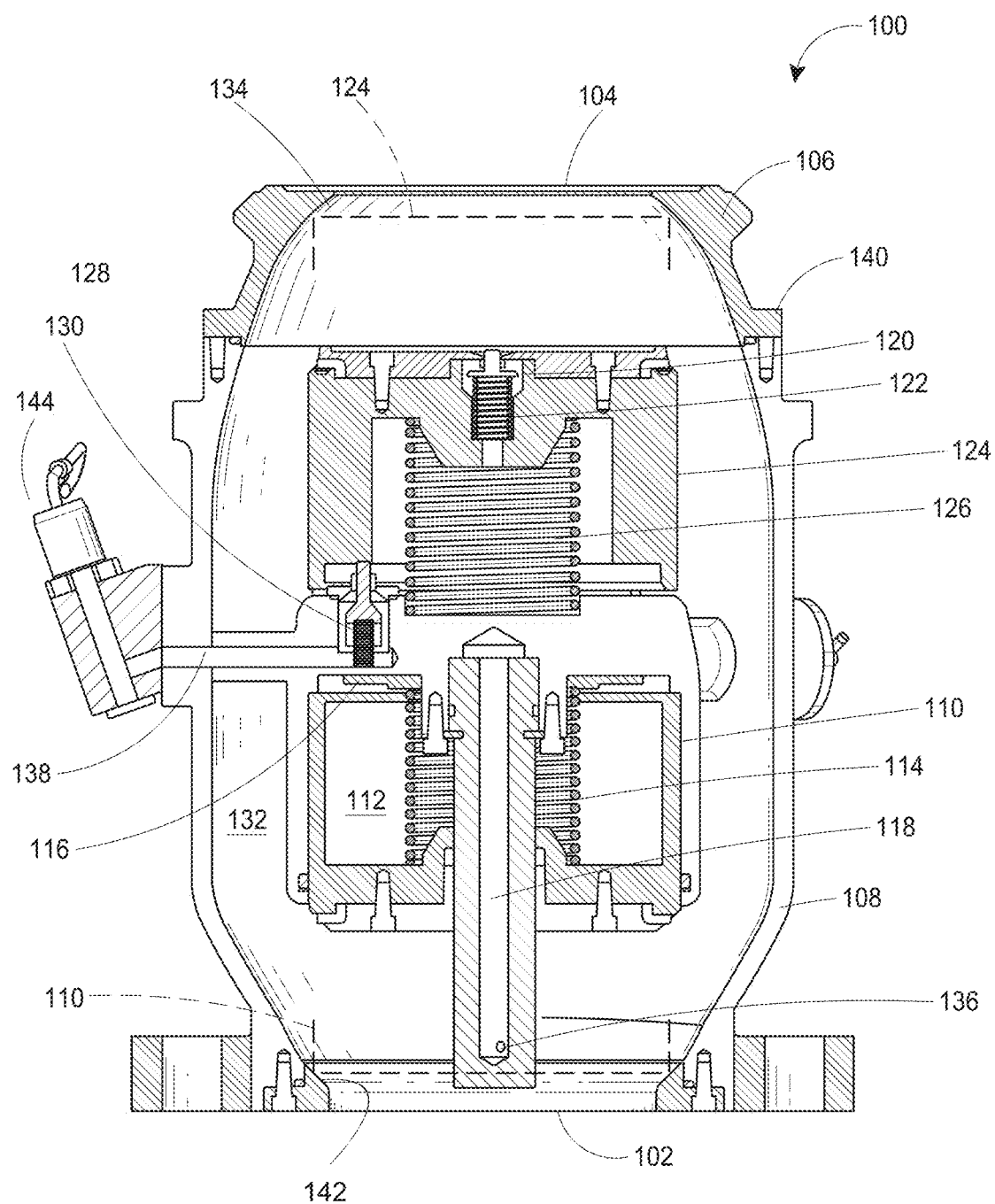
FIG. 1 shows a sectional view of an embodiment of a hydrant valve with a piston valve, an internal valve, and an upper valve in open positions.

Hydrant valves are normally installed in an open pit below ground level and connected to a fueling vehicle equipped with a hydrant valve coupler and hose system. The hose systems are at ground level and are still susceptible to collisions. Even when positioned in a pit, there may be a collision involving or affecting the hydrant valve. The open nature of the pit exposes the hydrant valve to various contaminants, such as water, spilled fuel, debris, abrasives, and the like. Examples of hydrant valves and portions thereof are disclosed in U.S. Pat. Nos. 3,286,725; 3,994,316; and 7,762,274, the entireties of which are incorporated by reference herein and made a part of the present disclosure. The disclosure herein is directed primarily toward an automatic shut-off valve. Accordingly, features, components or operation of the hydrant valve that is not discussed herein can be the same as or similar to those disclosed in these patents, or can be of another suitable arrangement known to those skilled in the art.

The hydrant valve may be compromised due to an event involving the fueling vehicle, hydrant valve coupler, hose system, and the like. The hydrant valve coupler may disengage from the hydrant valve. When the hydrant valve coupler disengages from the hydrant valve, fuel may spill creating safety and environmental concerns as well as wasting fuel. The hydrant valve coupler may break or the hydrant valve may be damaged due to a collision or other event and fuel may continue to spill until an operator shuts off the hydrant valve. The hydrant valve can have frangible connectors to ensure that, if the hydrant valve or connected system is struck a sufficient blow to damage the hydrant valve, the connectors will release from the hydrant. The hydrant valve may have a valve that can shut off flow automatically and not require actions by an operator.

The hydrant valve is typically designed to be opened or closed by an operator from a distance so that if a fuel spill occurs, the operator has the ability to terminate the flow of fuel by closing the hydrant valve from a safe distance. A delay in the response by the operator can result in a larger fuel spill. An automatic shut off valve in the hydrant valve can decrease the amount of fuel that spills.

Since electric power is normally lacking in the hydrant pit due to the concern over ignition of the fuel, the hydrant valve cannot be controlled electromechanically. The most commonly accepted method for controlling the opening and closing of hydrant valves is the utilization of pressure, either pneumatic or hydraulic, such that the fueling operator can apply or vent pressure to the hydrant valve through a handle valve and command hose which is commonly called a "deadman." Deadman controls must be manually held to an open position in order for the fueling operation to continue. Due to the high pressure and flow rates sustained by hydrant valves, practically all hydrant valves are pilot operated; that is, the main hydrant valve will be opened or closed by actuating a smaller pilot valve installed in the main hydrant valve.

FIG. 1 shows an embodiment of a hydrant valve 100, which can have a hydrant chamber 132 with an inlet 102 and an outlet 104. The inlet 102 connects to a fuel source (not shown). Fuel can flow through the hydrant chamber 132 from the inlet 102 to the outlet 104. The outlet 104 connects to a fueling vehicle (not shown), such as via a hose.

In some embodiments, the hydrant valve 100 can have an upper portion or coupler 106 that is secured with frangible connectors 140. The connectors 140 are of a proper material and size, such that they will break when the unit is subjected to excessive external forces. For example, if the coupler 106 is torn from the remainder of the hydrant valve 100. This intentional mechanical failure of the connectors 140 protects the hydrant valve 100 from damage that may be caused, for example, by the wheel of a truck or aircraft hitting the hydrant valve 100, coupler 106, and/or hose.

A piston 110 is in the hydrant chamber 132 and moveable between open and closed positions relative to the inlet 102. In the closed position (shown in dashed line), the piston 110 rests against seat 142 and substantially prevents or prevents fuel from flowing into the hydrant chamber 132 from the inlet 102. The piston 110 can have a biasing member, for example, spring 114, which biases the piston 110 towards the closed position.

Figure 2:
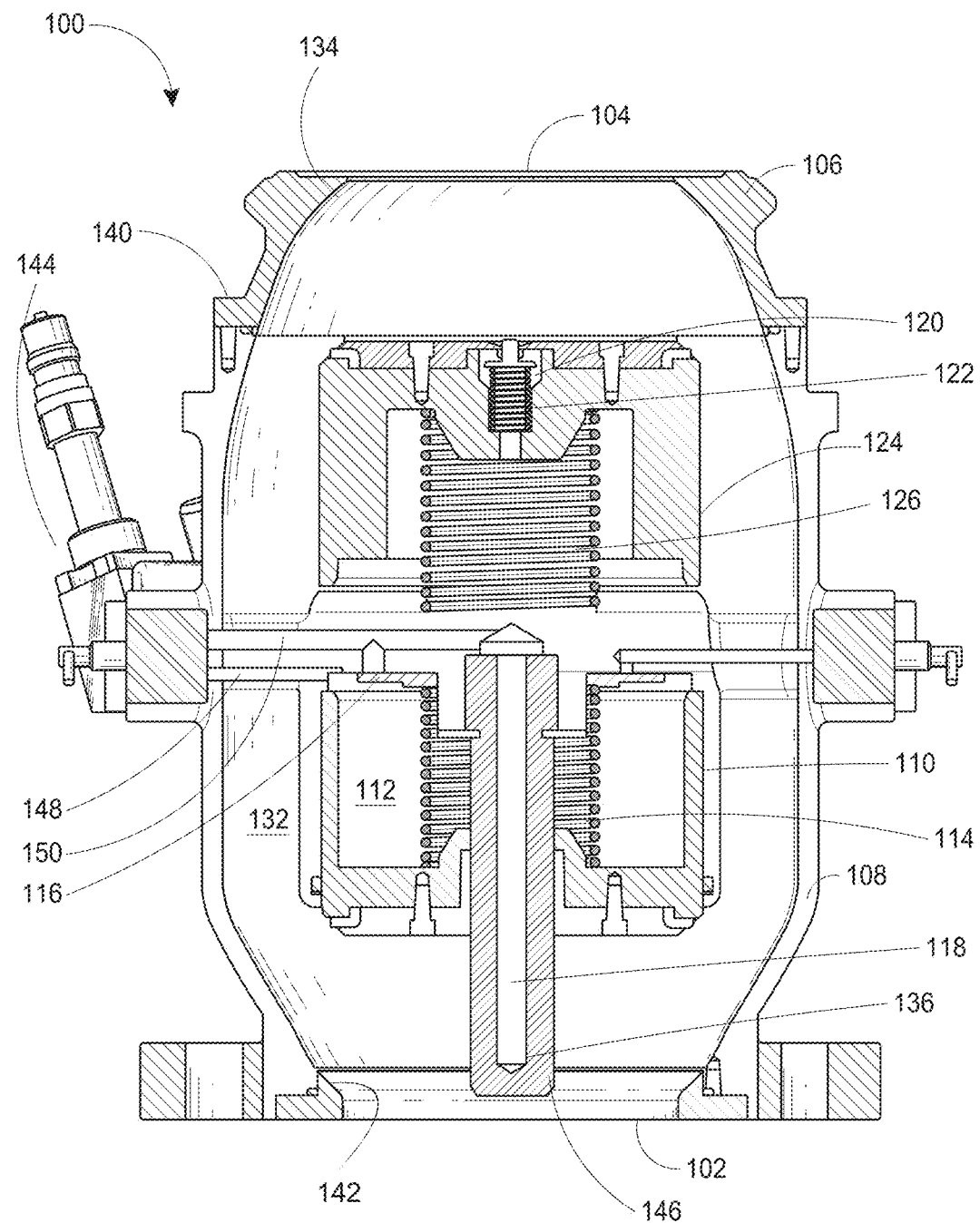
FIG. 2 shows a sectional view of the hydrant valve of FIG. 1, showing internal passages.

There is a chamber 112 inside piston 110. The piston chamber 112 is connected to the inlet 102. The piston chamber 112 can be connected to the inlet 102 by internal passages 150 and 118 and a one-way check valve 116, as shown in FIG. 2. The one-way check valve 116 allows fluid to enter piston chamber 112 when the pressure is higher in passage 150 than piston chamber 112. The one-way check valve 116 prevents fluid from moving from the piston chamber 112 to the passage 150. The internal passage 118 can be can be located centrally in some embodiments, as shown in FIG. 2. In some embodiments, the internal passage can be located a distance from the center of the hydrant valve 100, for example, outside of the spring 114 or near the edge of the hydrant body 108.

Figure 3:
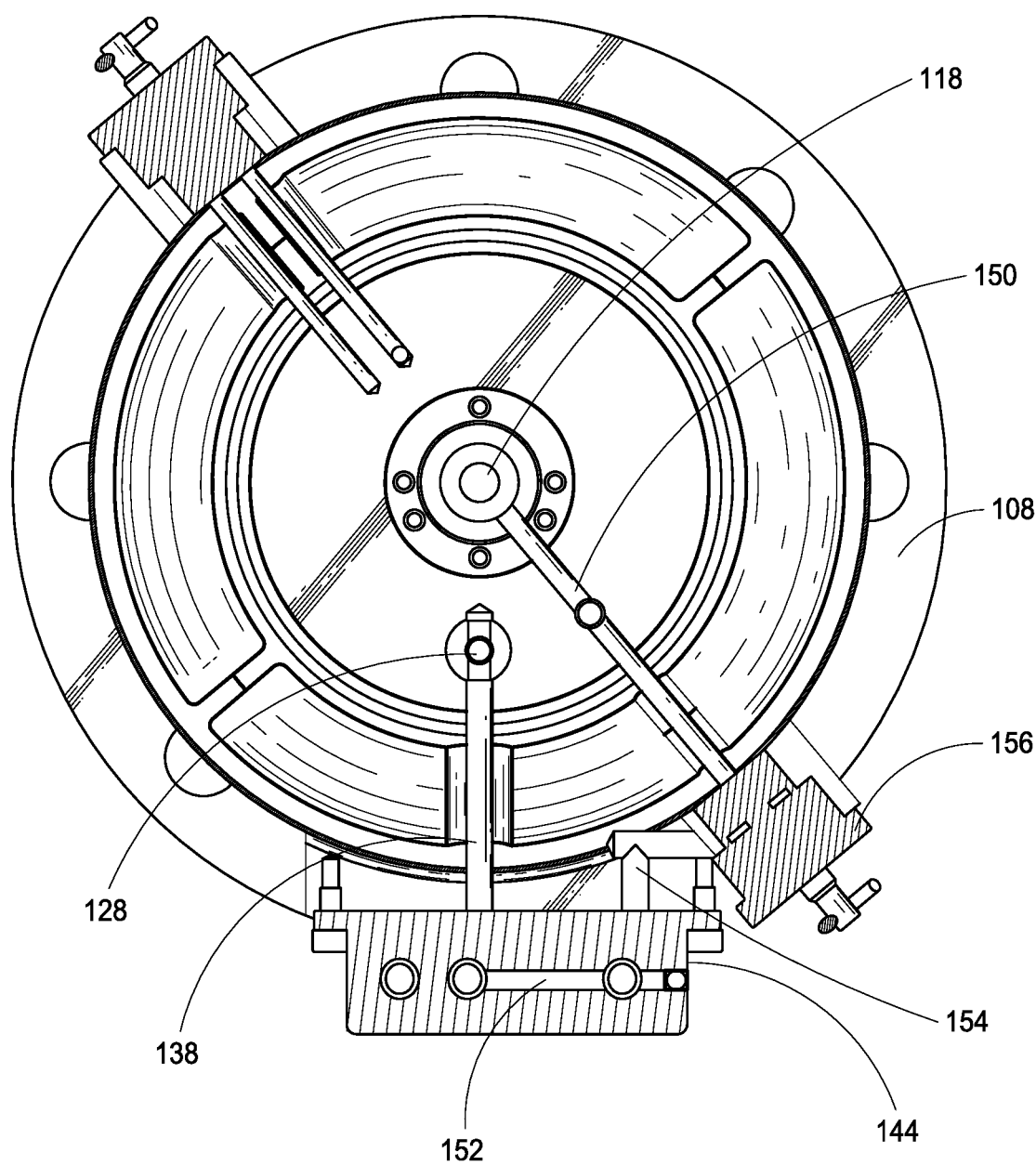
FIG. 3 shows a top sectional view of the hydrant valve of FIG. 1, showing internal passages.
Figure 4:
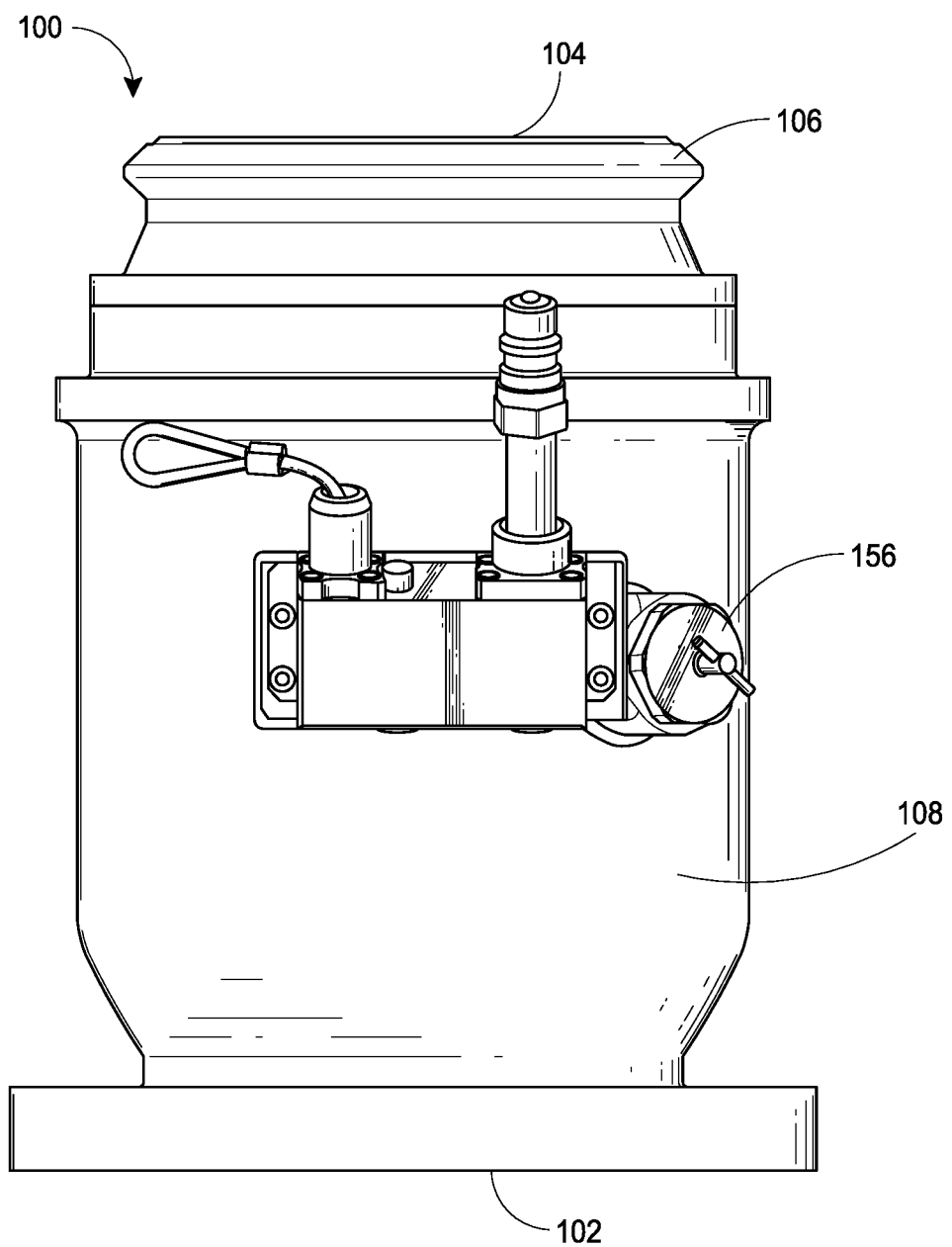
FIG. 4 shows a front view of the hydrant valve of FIG. 1, showing a pilot valve in the open position.

The piston chamber 112 is connected to the hydrant chamber 132. The piston chamber 112 can be connected to the hydrant chamber 132 through internal passages 148 and 138, pilot valve 144, and internal valve 128 in some embodiments, as shown in FIGS. 1-3. The passage 148 connects the piston chamber 112 with the pilot valve 144. The pilot valve can be a lanyard, air, or an air/lanyard operated valve, for example, as shown in FIG. 4. The pilot valve 144 can include an isolation valve 156. The pilot valve 144 can have passages 152 and 154 that connect passage 150 and passage 138, as shown in FIG. 3.

Fuel can flow from the piston chamber 112 to the hydrant chamber 132 when the pilot valve 144 and the internal valve 128 are open. When the piston chamber 112 is allowed to vent to the hydrant chamber 132, the piston chamber 112 pressure is lowered relative to the inlet pressure. This difference in pressure causes an imbalance of forces acting on the piston. The inlet pressure force on the piston 110 is greater than the combined piston pressure force and spring force on the piston 110, hence the piston valve 110 will open to allow flow.

The pilot valve 110 is kept open when it is a lanyard operated pilot by the pull of a "T" handle located on the top of the pilot valve 110. When the handle is pulled upward, the spring loaded latch attached to the lanyard pivots to lock the pilot valve 144 into the open position. The pilot valve 110 is kept open when it is an air or air/lanyard operated pilot by the applied pressure to the pilot piston, which maintains the pilot valve 110 in the open position until the pressure has been depleted by release of a deadman.

The hydrant valve 100 can be closed by a manual action at the hydrant valve 100 or away from the hydrant valve 100. Pulling the lanyard or depleting air supplied to the respective pilot will allow the spring loaded pilot poppet to close. Depleting the air supply can be accomplished by activating the deadman control or pulling the lanyard will release the air pressure. In the open position, the pilot valve 144 allows fluid to flow from the piston chamber 112 to the internal valve 128 and hydrant chamber 132. In the closed position, the pilot valve 144 restricts flow from the piston chamber 112 to the internal valve 128 and hydrant chamber 132.

The passage 138 connects the pilot valve 144 with the internal valve 128 and the hydrant chamber 132. The internal valve 128 can have a biasing member, for example, spring 130. In the open position, the internal valve 128 allows fluid to flow from the passage 138 to the hydrant chamber 132. In the closed position, the internal valve 128 restricts flow to the hydrant chamber 132.

An upper valve 124 is moveable between an open position (solid line) and a closed position (dashed line) relative to the outlet 104. In some embodiments, the upper valve 124 can be a poppet valve. In the closed position, the upper valve 124 rests against seat 134 and prevents fuel from flowing through the outlet 104 or inhibits or prevents entry of foreign material into the chamber 132 when no hose coupler is attached. The upper valve 124 can have a biasing member, for example, spring 126, which biases the upper valve 124 towards the closed position. The upper valve 124 can be moved to the open position by the attachment of a hose coupler (shown in dashed line).

In some embodiments, there can be a pressure equalization valve 120 in the upper valve 124. The pressure equalization valve 120 can have a biasing member, for example, spring 122 that biases the valve 120 toward the closed position. The pressure equalization valve 120 opens in response to a greater pressure outside of the hydrant valve 100 compared to inside the hydrant valve 100 when the upper valve 124 is in the closed position.

In some embodiments, the upper valve 124 can be engageable with the internal valve 128, such that a movement of the upper valve 124 can result in a movement of the internal valve 128. When the upper valve 124 is in an open position, the internal valve 128 is moved to an open position by the upper valve 124. A predetermined movement of the upper valve 124 results in the internal valve 128 moving to a closed position. As the upper valve 124 rises, the internal valve 128 moves towards a closed position. The movement of internal valve 128 with respect to the movement of the upper valve 124 can be configured to have a sensitivity needed for specific circumstances.

The internal valve 128 may be configured to close when the attached hose coupler and/or upper portion 106 of the hydrant valve 100 is compromised such that the upper valve 124 moves toward or to a closed position. In some embodiments, the internal valve 128 closes when the coupler at least partially detaches from the upper valve 124. In some embodiments, the internal valve 128 closes when the coupler completely detaches from the upper valve 124. In some embodiments, the internal valve 128 closes when the upper portion 106 at least partially detaches. In some embodiments, the internal valve 128 closes when the upper portion 106 completely detaches. In some embodiments, the internal valve 128 closes when the connectors 140 break.

In some embodiments, the internal valve 128 can reach its closed position before the upper valve 124 reaches its closed position. In some embodiments, the internal valve 128 can reach its closed position when the upper valve 124 is partially closed. In some embodiments, the internal valve 128 can reach its closed position when the upper valve 124 is in a closed position.

In some embodiments, the internal valve 128 can be engageable with the coupler, such that a predetermined movement of the coupler results in the closure of the internal valve 128. In some embodiments, when the coupler is attached the internal valve 128 is in an open position.

In some embodiments, there may be one or more closing control orifices that aid the closing of the piston 110. A primary closing control orifice 136 can be larger than a secondary closing control orifice 146. The secondary closing control orifice 146 can be, for example, a longitudinally-extending slot. During the initial and majority of the travel of the piston 110, the primary closing control orifice 136 is fully exposed to the inlet pressure; hence, this orifice controls the rate of closure. When the piston 110 moves far enough closed to cover the primary closing control orifice 136, the secondary closing control orifice 146, which is smaller, begins to control the rate of closure. The piston valve 110 initially closes relatively rapidly and then slows down as it nears its closed position. The relative size and locations of these two orifices allows the valve to close to provide a minimum of overshoot and yet limit the surge pressure shock on closing and still maintain a closure rate in accordance with applicable international specifications. In some embodiments, there may be a single closing orifice so that the valve 110 closes at a nearly constant rate.

Example of Hydrant Valve Closing Automatically

FIG. 1 illustrates the hydrant valve 100 with the pilot valve 144, upper valve 124, and piston valve 110 in open positions. The internal valve 128 is held in an open position by the upper valve 124. These open positions allow fluid to flow from a fuel source (not shown) connected to inlet 102 through the hydrant chamber 132 to outlet 104 connected to a fueling vehicle (not shown). The inlet pressure force acting to open the piston valve 110 is greater than the combined pressure force and spring force acting to close the piston valve 110, hence the piston valve 110 will open to allow flow.

The pilot valve is kept open when it is a lanyard operated pilot by the pull of a "T" handle located on the top of the pilot valve. When the handle is pulled upward, the spring loaded latch attached to the lanyard pivots to lock the pilot into the open position. The pilot valve is kept open when it is an air or air/lanyard operated pilot by the applied pressure to the pilot piston, which maintains the pilot in the open position until the pressure has been depleted by release of a deadman. The pilot valve 144 in an open position allows the fluid to flow from passage 150 to passage 138 and internal valve 128. If the pilot valve 144 is manually closed then the flow into passage 138 will be restricted. However, if the pilot valve assembly 144 is not manually closed, fluid will continue to flow through the hydrant valve 100.

If the hydrant valve 100 has been uncoupled from the fueling vehicle, fuel may spill creating unsafe conditions. There may be a disconnection of the hose coupler and/or upper portion 106 that is not noticed or it may be difficult to physically get to the pilot valve assembly 144. As a result, in prior hydrant valves, there may be delay in the manual shut-off of the hydrant valve and any delay may result in a larger fuel spill. In the illustrated hydrant valve 100, the internal valve 128 is configured to automatically close the hydrant valve 100 at the inlet 102 when the upper section 106 is compromised.

When external forces are exerted on the upper portion 106 sufficient to separate the upper portion 106 from the hydrant body 108, the internal valve 128 will automatically close. The internal valve 128 is held in the open position by the upper valve 124. A movement of the hose coupler or upper portion 106 away from the hydrant body 108 will result in the upper valve 124 moving upwards towards the closed position. A movement of the upper valve 124 upwards will release the internal valve 128 and allow the internal valve 128 to close. Internal valve 128 is biased towards the closed position because of biasing member 126.

In the closed position, the internal valve 128 blocks the flow from passage 138 to the hydrant chamber 132. In the closed position, the internal valve 128 prevents venting of the piston chamber 112 to the hydrant chamber 132, even when the pilot valve 144 is in the open position. As a result, the piston chamber 112 fills with fluid at the inlet pressure. The fluid flows from the inlet 102 through passages 118 and 150 and check valve 116 into the piston chamber 112. The equalization of pressure plus the force from spring 114 closes the piston valve 110. As the piston 110 moves toward the closed position, the piston chamber 112 volume increases and continues to be filled by fluid at the inlet pressure. Fuel will stop flowing when the piston 110 rests against seat 142, even though the pilot valve 144 remains in the open position. The piston valve 110 remains in the closed position because the force resulting from the pressure exerted on the piston valve 110 within the piston chamber 112 plus the force from spring 114 is greater than the opposing force resulting from the pressure exerted on the piston valve 110 at the inlet 102, which acts on a somewhat smaller area of the piston valve 110 exposed to the inlet 102.

The internal valve 128 can be opened again when the hose coupler or upper portion 106 is properly attached to the upper valve 124. The internal valve 128 moves to the open position when the upper valve 124 is moved to its open position. When the internal valve 128 and pilot valve 144 are open, the piston valve 110 will open and allow fuel to flow through the hydrant valve 100.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present hydrant valve has been described in the context of particularly preferred embodiments, the skilled artisan will appreciate, in view of the present disclosure, that certain advantages, features and aspects of the mechanism and overall system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A hydrant valve comprising:
a hydrant chamber having an inlet and an outlet;
a piston in the hydrant chamber moveable between open and closed positions relative to the inlet and a chamber disposed within the piston in communication with the inlet and the hydrant chamber;
wherein the piston, when in the closed position, is in contact with a seat;
an upper valve movable between open and closed positions relative to the outlet along a first axis, the upper valve having a biasing member that biases the upper valve toward the closed position, in the closed position the upper valve restricts fluid flow through the outlet and in the open position the upper valve permits fluid flow through the outlet;
an internal valve movable between open and closed positions in response to a movement of the upper valve, in the open position the internal valve permits fluid flow between the hydrant chamber and the piston chamber and in the closed position the internal valve restricts fluid flow between the hydrant chamber and the piston chamber, wherein the internal valve is directly contacted by the upper valve and moves along a second axis that is parallel with the first axis.

2. The hydrant valve of claim 1 further comprising:
a pilot valve movable between open and closed positions, in the open position the pilot valve allows flow between the inlet and the internal valve and in the closed position the pilot valve allows flow between the inlet and the piston chamber.

3. The hydrant valve of claim 1, wherein the hydrant valve further comprises an upper portion.

4. The hydrant valve of claim 3, wherein at least one frangible connector secures the upper portion.

5. The hydrant valve of claim 1, wherein the internal valve moves towards the closed position in response to the upper valve moving towards the closed position.

6. The hydrant valve of claim 1, wherein in the closed position the internal valve allows fluid flow between the inlet and the piston chamber and closes the piston.

7. The hydrant valve of claim 3, wherein the internal valve moves towards the closed position in response to a movement of the upper portion.

8. The hydrant valve of claim 3, wherein the internal valve moves towards the closed position in response to at least a partial removal of the upper portion.

9. The hydrant valve of claim 1, further comprising a coupler that is configured to open the upper valve when attached, wherein the internal valve closes when the coupler is detached.

10. The hydrant valve of claim 2, wherein the piston is in the closed position when the internal valve is in the closed position and the pilot valve is in the open position.

* * * * *